(12) United States Patent
Suzuki

(10) Patent No.: US 7,800,797 B2
(45) Date of Patent: Sep. 21, 2010

(54) DOCUMENT READING APPARATUS AND METHOD OF DETERMINING POSITION OF CARRIAGE

(75) Inventor: Taishi Suzuki, Moriya (JP)

(73) Assignee: Seiko Epson Corporation, Tokyo (JP)

( * ) Notice: Subject to any disclaimer, the term of this patent is extended or adjusted under 35 U.S.C. 154(b) by 479 days.

(21) Appl. No.: 11/900,713

(22) Filed: Sep. 13, 2007

(65) Prior Publication Data

US 2008/0204821 A1 Aug. 28, 2008

(30) Foreign Application Priority Data

Sep. 14, 2006 (JP) ............................. 2006-249475

(51) Int. Cl.
*H04N 1/04* (2006.01)
*H04N 1/00* (2006.01)

(52) U.S. Cl. ..................... 358/497; 358/474; 358/486; 358/406

(58) Field of Classification Search ................. 358/474, 358/494, 497, 486, 483, 482, 487, 406, 505, 358/506, 504; 399/211, 212; 250/234
See application file for complete search history.

(56) References Cited

U.S. PATENT DOCUMENTS 5,116,150 A * 5/1992 Courtney ................... 400/320
5,966,220 A * 10/1999 Miyamoto et al. ........... 358/475
7,133,165 B2 * 11/2006 Yamada et al. .............. 358/474
7,551,330 B2 * 6/2009 Yamada et al. .............. 358/474
2008/0074716 A1 * 3/2008 Yoshihisa ................... 358/497

FOREIGN PATENT DOCUMENTS

JP 03171866 A * 7/1991
JP 2006-010718 1/2006

* cited by examiner

*Primary Examiner*—Cheukfan Lee
(74) *Attorney, Agent, or Firm*—Nutter McClennen & Fish LLP; John J. Penny, Jr.; Michael P. Visconti, III

(57) ABSTRACT

A document reading apparatus includes: a carriage, including an image reading sensor for reading an image from a document, and reciprocating in a predetermined range; contact portions, disposed at both ends of the predetermined range; a judgment section, judging whether the carriage comes in contact with the contact portions; a positional information temporary determining section, temporarily determining positional information when the judgment section judges that the carriage comes in contact with one of the contact portions; and a positional information check section, checking whether the positional information is correct based on a moving distance between positions where the judgment section judges that the carriage comes in contact with the contact portions, and determining the positional information when it is confirmed that the positional information is correct. The carriage moves to a position where the carriage starts to move at a speed greater than a speed at which the carriage moves before the positional information is temporarily determined.

5 Claims, 7 Drawing Sheets

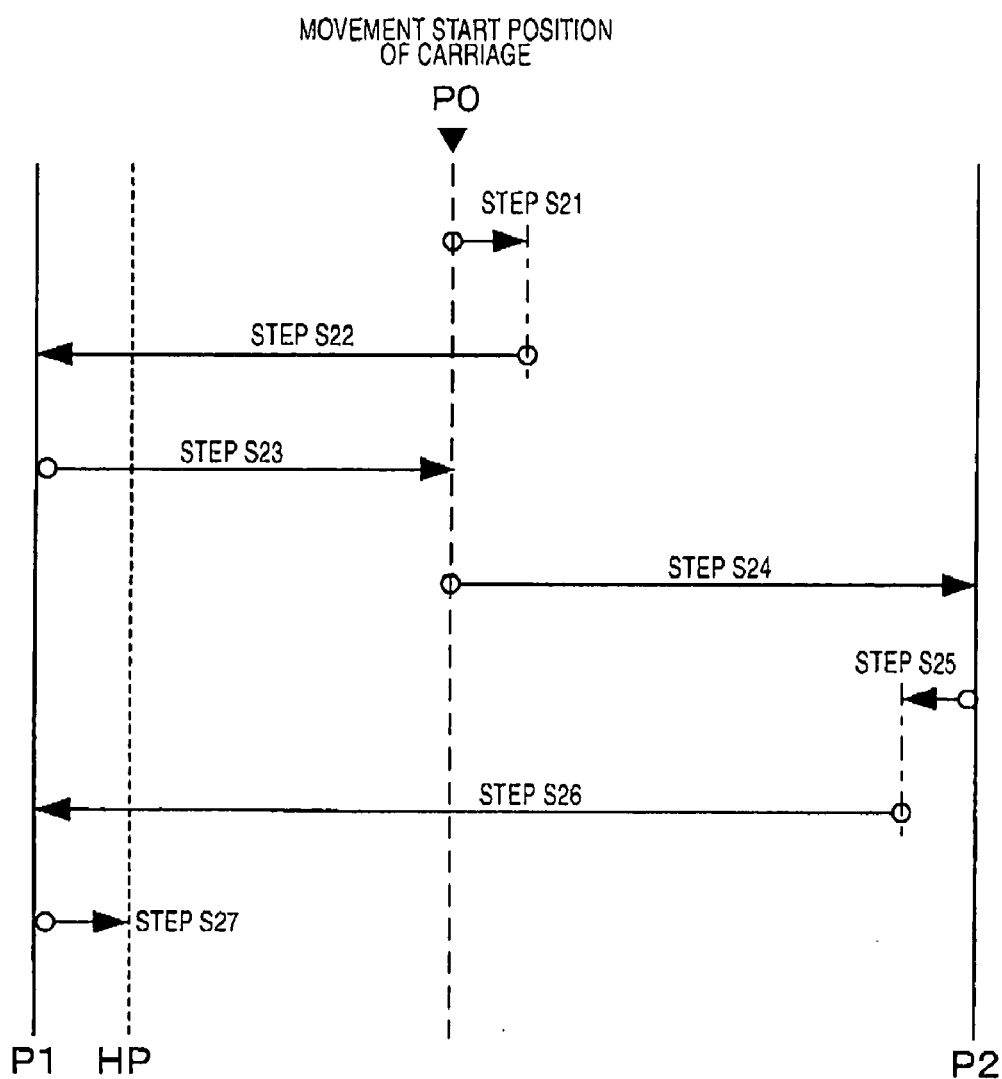

DOCUMENT READING APPARATUS AND METHOD OF DETERMINING POSITION OF CARRIAGE

BACKGROUND

1. Technical Field

The present invention relates to a document reading apparatus for determining a position of a carriage that reciprocates in a predetermined range along a predetermined direction and a method of determining a position of a carriage.

2. Related Art

Various image reading devices such as an image scanner include an image reading sensor such as an image sensor to read an image from a document. The image reading sensor is disposed in a so-called carriage that moves relative to the document. At the time of reading an image from a document, the image reading sensor reads an image from a document while moving relative to the document along with the carriage. Here, the carriage mounted with the image reading sensor starts its movement from a predetermined reference position called a home position (HP), moves relative to the document, and performs an operation of reading an image of the document by the use of the image reading sensor. In the related art, a home position sensor is provided to detect whether the carriage is located at the home position (HP) (see JP-A-2006-10718).

However, to provide the home position sensor causes an increase in the number of components and an increase in cost. Accordingly, without using the home position sensor, it is necessary to locate the carriage mounted with the image reading sensor at the home position at the time of reading an image from a document.

SUMMARY

An advantage of some aspects of the invention is to provide an image reading apparatus and a method of determining a position of a carriage, which are capable of disposing an image reading sensor at a predetermined reference position (home position) without using a sensor such as a home position sensor at the time of reading an image from a document.

According to an aspect of the invention, there is provided a document reading apparatus comprising:
- a carriage, including an image reading sensor for reading an image from a document, and adapted to reciprocate in a predetermined range along a predetermined direction;
- contact portions, disposed at both ends of the predetermined range, wherein the carriage comes in contact with the contact portions so that a movement of the carriage is regulated;
- a judgment section, operable to judge whether the carriage comes in contact with the contact portions;
- a positional information temporary determining section, operable to temporarily determine positional information of the carriage when the judgment section judges that the carriage comes in contact with one of the contact portions; and
- a positional information check section, after the positional information is temporarily determined by the positional information temporary determining section, operable to check whether the positional information is correct based on a moving distance of the carriage from a first position where the judgment section judges that the carriage comes in contact with the one of the contact portions to a second position where the judgment section judges that the carriage comes in contact with the other of the contact portions, and operable to determine the positional information when it is confirmed that the positional information is correct, wherein after the positional information is temporarily determined by the positional information temporary determining section, when the carriage moves from the first position to the second position, the carriage moves to a third position where the carriage starts to move before the positional information is temporarily determined by the positional information temporary determining section, at a moving speed greater than a moving speed at which the carriage moves before the positional information is temporarily determined by the positional information temporary determining section.

The present disclosure relates to the subject matter contained in Japanese patent application No. 2006-249475 filed on Sep. 14, 2007, which is expressly incorporated herein by reference in its entirety.

BRIEF DESCRIPTION OF THE DRAWINGS

The invention will be described with reference to the accompanying drawings, wherein like numbers reference like elements.

FIG. 6 is a diagram illustrating a method of actually determining a position of the carriage.

DESCRIPTION OF EXEMPLARY EMBODIMENTS

Outline of Image Reading Device

Here, a device for determining a position of a carriage according to the invention will be described in detail with reference to a case where the device is mounted on an image reading device.

Figure 1:
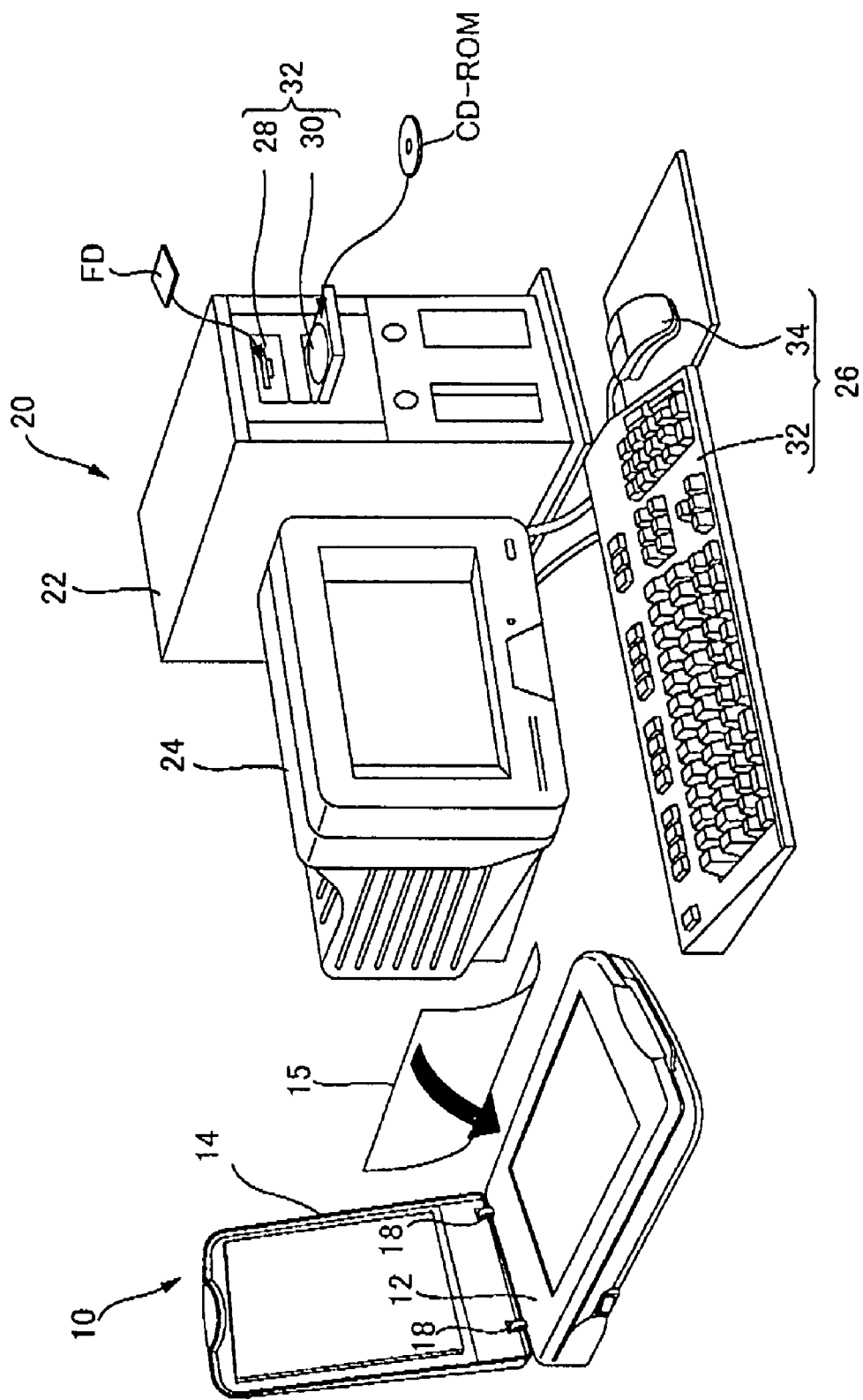
FIG. 1 is a diagram illustrating an image reading system according to an embodiment of the invention.
Figure 2:
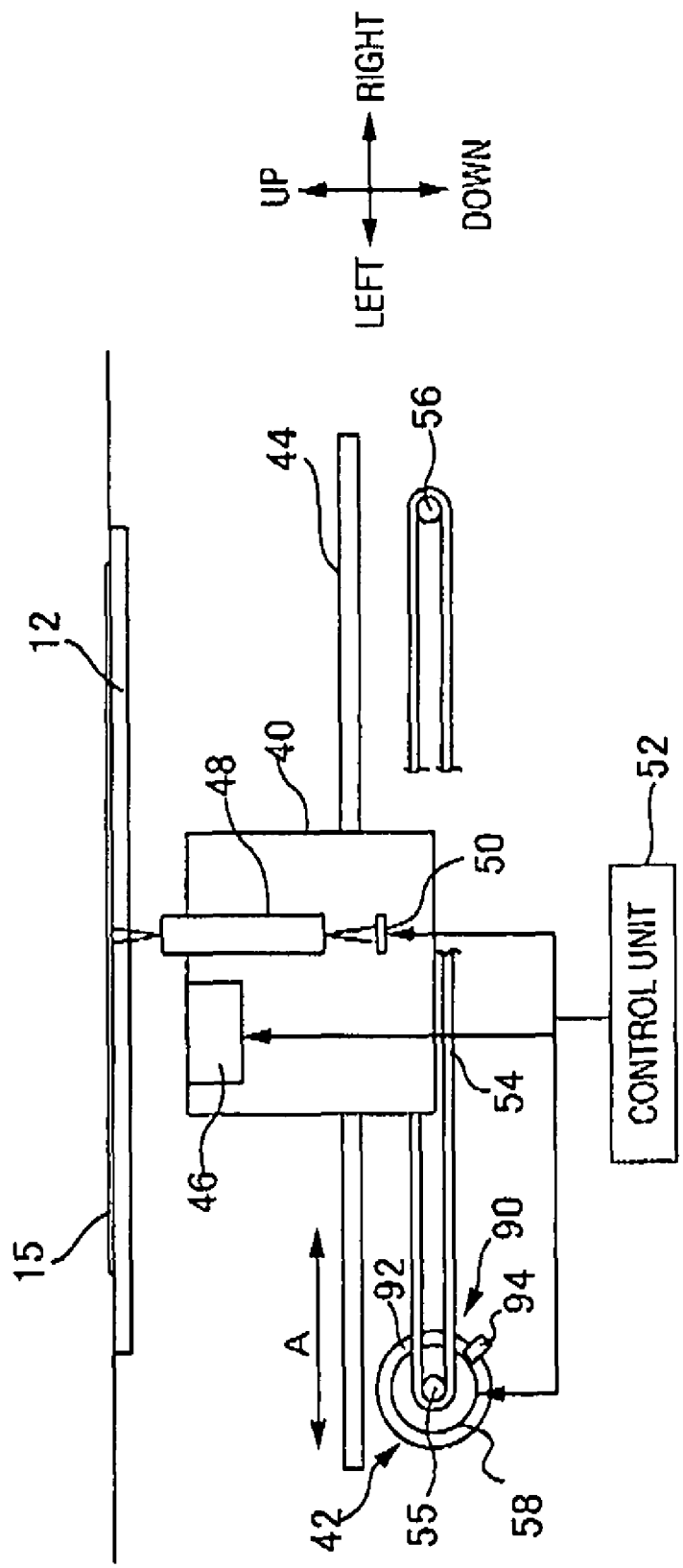
FIG. 2 is a diagram illustrating an inner configuration of an image reading device.
Figure 3:
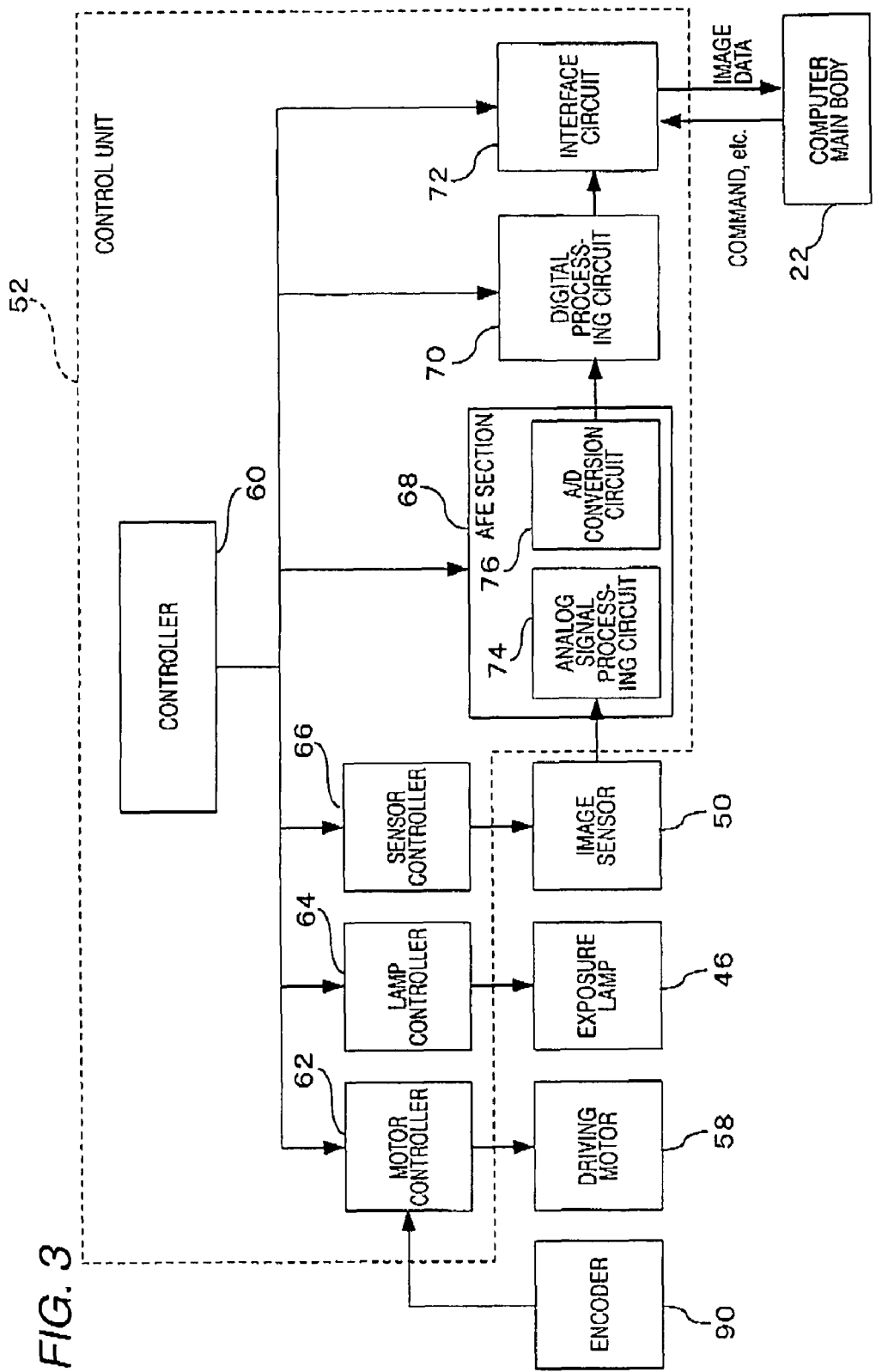
FIG. 3 is a diagram illustrating a system configuration of the image reading device.

FIGS. 1 to 3 illustrate an embodiment of an image reading device. FIG. 1 is a diagram illustrating an image reading device according to an embodiment of the invention. FIG. 2 is a diagram illustrating an inner configuration of the image reading device. FIG. 3 is a diagram illustrating a diagram illustrating a block configuration of the image reading device.

As shown in FIG. 1, the image reading device 10 is connected to a computer 20 so as to be communicable by wireless or wired. Here, the image reading device 10 is a device generally called an image scanner as shown in FIG. 1 and includes a document table 12 and a document table cover 14 for opening and closing the top portion of the document table 12. A document 15 from which an image is read is mounted on the document table 12. The document table cover 14 is disposed at the rear end portion of the document table 12 so as to be openable by a hinge portion 18.

On the other hand, the computer 20 includes a computer main body 22, a display unit 24, and an input unit 26, for example, as shown in FIG. 1. The computer main body 22 may be various computers such as a personal computer. Here, the computer main body 22 has a reading unit 32 such as an FD drive 28 or a CD-ROM drive 30 therein. The computer main body 22 may further include an MO (Magnet Optical) disc drive or a DVD drive. The display unit 24 may be various display devices such as a CRT display, a plasma display, and a liquid crystal display. The input unit 26 may include a keyboard 34 or mouse 36.

<Image Reading Device>

As shown in FIG. 2, the image reading device 10 is provided therein with a carriage 40, a driving mechanism 42 for moving the carriage 40 in parallel to the document table 12 in the direction of arrow A in the figure with a predetermined gap maintained therebetween, and a guide 44 for supporting the carriage 40 and guiding the movement thereof.

The carriage 40 includes an exposure lamp 46 as a light source emitting light to the document 15 with the document table 12, a lens 48 on which the reflected light reflected from the document 15 is incident, and an image sensor 50 receiving the reflected light entering the inside of the carriage 40 through the lens 48. The image sensor 50 includes a linear CCD sensor in which photoelectric conversion elements such as photo diodes for converting optical signals into electrical signals are arranged in a linear shape. Data of an image read by the image sensor 50 are output to the control unit 52.

The driving mechanism 42 includes a timing belt 54 connected to the carriage 40, a pair of pulleys 55 and 56 on which the timing belt 54 is suspended, and a driving motor 58 for driving one pulley 55 so as to rotate. The driving motor 58 is controlled by the use of a control signal from the control unit 52.

In the driving mechanism 42, an encoder 90 is disposed in the vicinity of the driving motor 58. The encoder 90 is a rotary encoder and detects the position, the moving distance, and the moving speed of the carriage 40 by detecting the rotational amount of the driving motor 58. The encoder 90 includes an encoder sign plate 92 disposed integrally with the rotation shaft of the driving motor 58 and a detection portion 94 disposed adjacent to the encoder sign plate 92. Small slits (not shown) are formed on the outer periphery of the encoder sign plate 92 with a predetermined gap therebetween. The detection portion 94 detects the slits (not shown) disposed on the outer periphery of the encoder signal plate 92 and outputs a detection signal corresponding to the rotational amount of the driving motor 58.

<Control Unit>

As shown in FIG. 3, the control unit 52 includes a controller 60, a motor controller 62, a lamp controller 64, a sensor controller 66, an AFE (Analog Front End) section 68, a digital processing circuit 70, and an interface circuit 72. The AFE section 68 includes an analog signal processing circuit 74 and an A/D conversion circuit 76.

The controller 60 controls the motor controller 62, the lamp controller 64, the sensor controller 66, the AFE section 68, the digital processing circuit 70, and the interface circuit 72 on the basis of commands from the computer main body 22. The motor controller 62 controls the driving of the driving motor 58 for moving the carriage 40 in accordance with the command from the controller 60. Here, the detection signal such as a position, a moving distance, and a moving speed of the carriage 40 output from the encoder 90 is input to the motor controller 62. The motor controller 62 controls the driving of the driving motor 58 on the basis of the detection signal from the encoder 90. The lamp controller 64 controls the light emission of the exposure lamp 46. The sensor controller 66 controls the image sensor 50.

The analog signal processing circuit 74 of the AFE (Analog Front End) section 68 processes analog signals of the image read by the image sensor 50. The A/D conversion circuit 76 of the AFE section 68 converts the signals of the image processed by the analog signal processing circuit 74 into digital signals.

The digital processing circuit 70 performs a digital signal process on the digital signals sent from the A/D conversion circuit 76 of the AFE section 68. Here, various image processes of a correction process such as shading correction, etc. are specifically performed. The digital signals having been subjected to the digital signal process are output to the outside, that is, the computer main body 22 connected to the image reading device 10, through the interface circuit 72 as the data of the image (image data) read from the document 15. The interface circuit 72 receives other commands on the image reading device 10 from the computer main body 22.

Moving Range of Carriage

Figure 4:
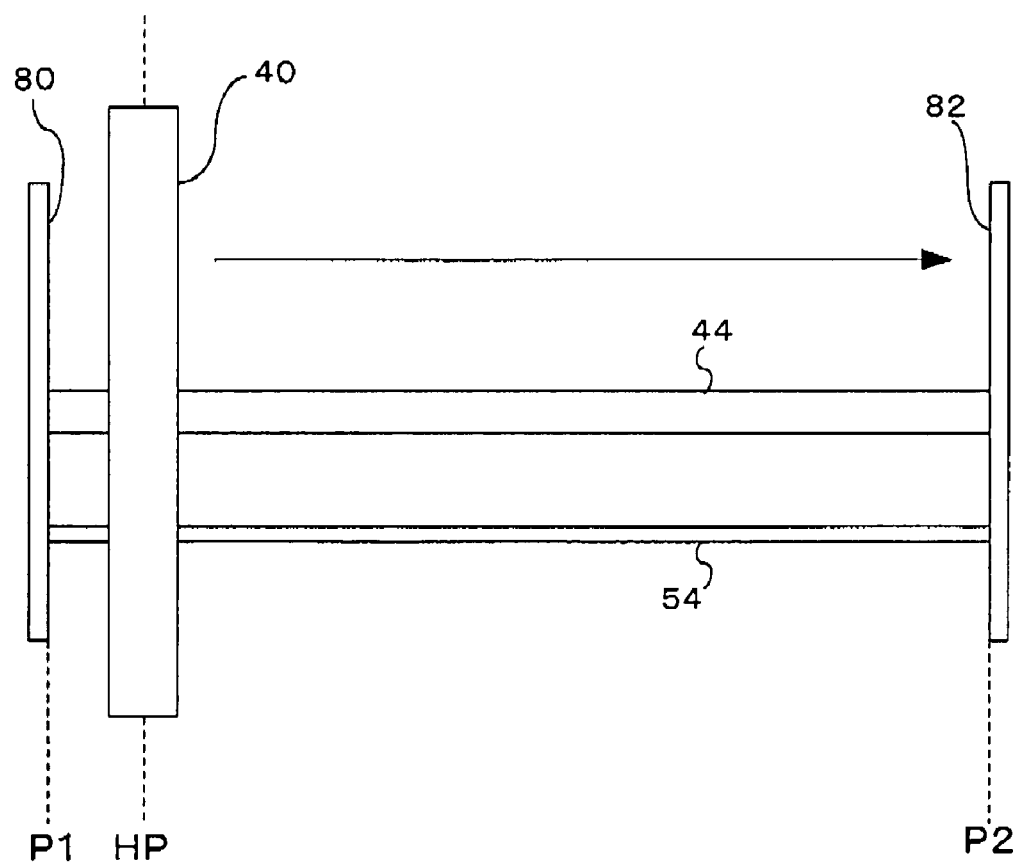
FIG. 4 is a diagram illustrating a movement range of a carriage.

FIG. 4 is a diagram illustrating a moving range of the carriage 40. As shown in FIG. 2, the carriage 40 is connected to the timing belt 54 and reciprocates in a predetermined range along the guide 44 by the driving mechanism 42. In this embodiment, wall portions 80 and 82 are disposed at both ends of the predetermined range in which the carriage 40 reciprocates, respectively. The wall portions 80 and 82 come in contact with the carriage 40 to regulate the movement of the carriage 40 when the carriage 40 moves to the wall portions 80 and 82. Accordingly, the carriage 40 reciprocates between two wall portions 80 and 82.

At a place close to one of the two wall portions 80 and 82, a predetermined reference position is set which is called a home position (HP) from which the carriage 40 mounted with the image sensor 50 starts its movement for performing an operation of reading an image from a document while moving relative to the document. In this embodiment, the home position (HP) is set at a position close to one wall portion 80 (left wall portion in the figure) of the two wall portions 80 and 82.

Here, the wall portion 80 located at a position close to the home position (HP) is referred to as a home-position side wall portion. The wall portion 82 located at a position apart from the home position (HP) is referred to as an anti-home-position side wall portion. The position at which the carriage 40 comes in contact with the home-position side wall portion 80 is point P1. Te position at which the carriage 40 comes in contact with the anti-home-position sidewall portion 82 is point P2. The carriage 40 reciprocates between points P1 and P2.

Method of Determining Position of Carriage

Figure 5A:
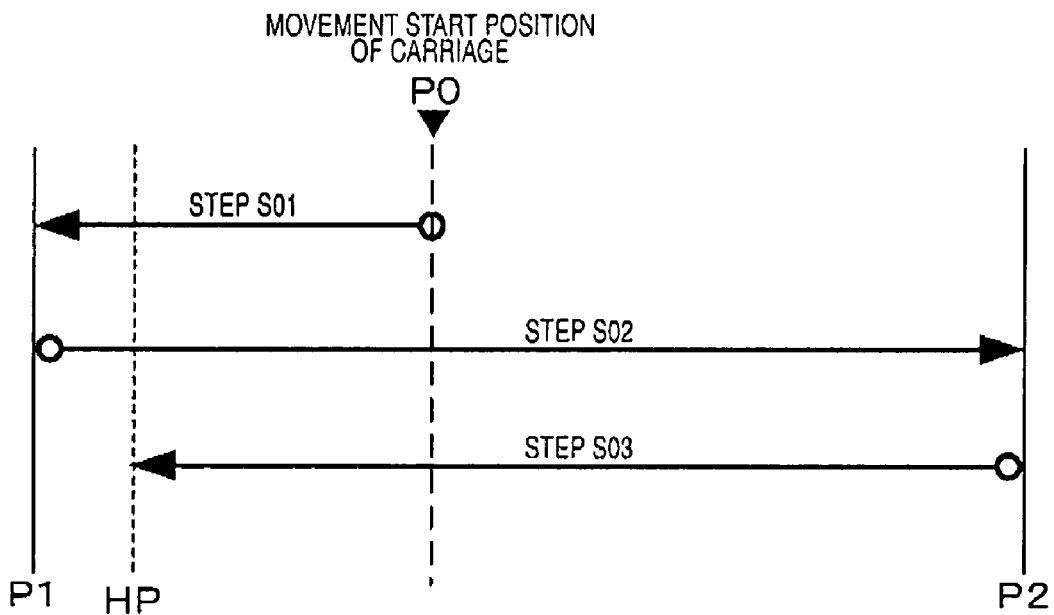
FIG. 5A is a diagram illustrating a method of determining a position of the carriage according to the invention.
Figure 5B:
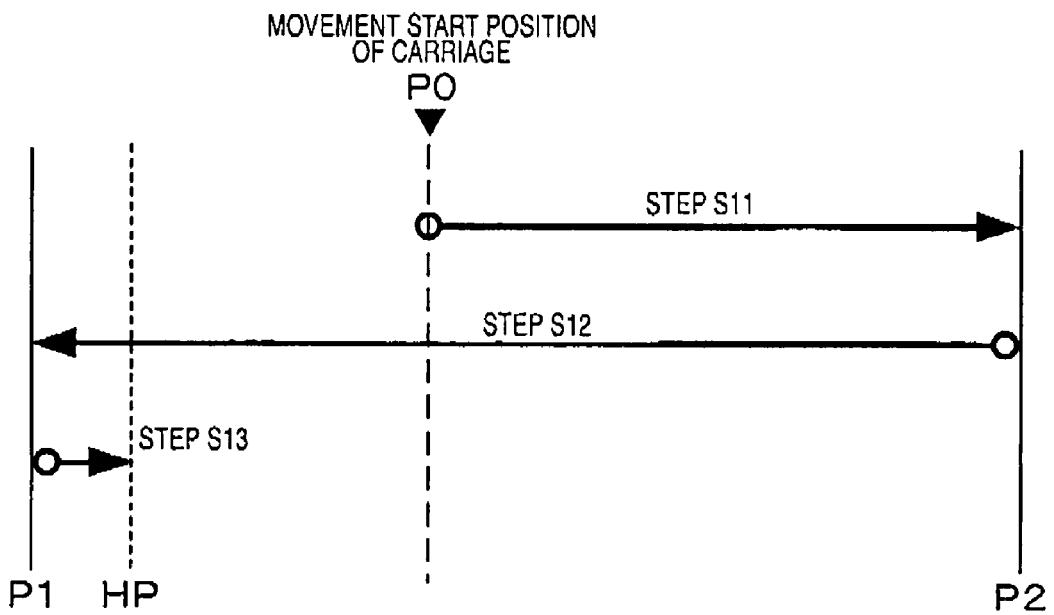
FIG. 5B is a diagram illustrating another method of determining a position of the carriage according to the invention.

Next, a method of determining a position of the carriage 40 according to this embodiment will be described. FIGS. 5A and 5B illustrate examples of the method of determining a position of the carriage 40.

In this embodiment, when the current position of the carriage 40 is not clear, the carriage 40 is first made to move to one of the home-position side wall portion 80 and the anti-home-position side wall portion 82. FIG. 5A illustrates an example of the method of determining the position of the carriage 40 when the carriage 40 is made to move to the home-position side wall portion 80. FIG. 5B illustrates an example of the method of determining the position of the carriage 40 when the carriage 40 is made to move to the anti-home-position side wall portion 82.

When the carriage 40 is made to move to the home-position side wall portion 80, as shown in FIG. 5A, the carriage 40 is made to move until carriage 40 comes in contact with the home-position side wall portion 80 (step S01). When the carriage 40 comes in contact with the home-position side wall portion 80, the moving speed of the carriage 40 is equal to or less than a predetermined speed, that is, almost zero in this case. Accordingly, it is possible to judge whether the carriage 40 comes in contact with the home-position side wall portion 80 on the basis of the signal output from the encoder 90. Here, the judgment whether the carriage 40 comes in contact with the home-position side wall portion 80 can be performed by the use of the controller 60 or the like.

When it is judged that the carriage 40 comes in contact with the home-position side wall portion 80, the position of the carriage 40 is temporarily determined by considering that the carriage 40 comes in contact with the home-position side wall portion 80 at point P1.

This is because the moving speed of the carriage 40 may decrease due to an external impact or the like until the carriage 40 ends its movement after starting the movement and it may be thus judged that the carriage 40 comes in contact with the home-position sidewall portion 80 even when the carriage 40 does not come in contact with the home-position side wall portion 80. Accordingly, in this embodiment, the position of the carriage 40 is not completely determined but temporarily determined at this time. Here, the temporary determination of the position of the carriage 40 can be performed by the controller 60 or the like.

After the position of the carriage 40 is temporarily determined in this way, the carriage 40 is made to move in a direction opposite to the previous movement direction. That is, the carriage 40 is made to move to the anti-home-position side wall portion 82 opposite to the home-position side wall portion 80 (step S02). Then, the carriage 40 is brought into contact with the anti-home-position side wall portion 82. Here, when the carriage 40 comes in contact with the anti-home-position side wall portion 82, the moving speed of the carriage 40 is equal to or less than a predetermined speed, that is, almost zero in this case. Accordingly, it is possible to easily judge whether the carriage 40 comes in contact with the anti-home-position side wall portion 82 on the basis of the signal output from the encoder 90. Here, the judgment whether the carriage 40 comes in contact with the anti-home-position side wall portion 82 can be performed by the use of the controller 60 or the like.

When it is judged that the carriage 40 comes in contact with the anti-home-position side wall portion 82, a moving distance from the position (point P1) where it has been judged that the carriage 40 comes in contact with the home-position side wall portion 80 to the position (point P2) where it has been judged that the carriage 40 comes in contact with the anti-home-position sidewall portion 82 is acquired. The moving distance of the carriage 40 can be acquired based on the output signal from the encoder 90.

It is checked whether the moving distance from the position (point P1) where it has been judged that the carriage 40 comes in contact with the home-position side wall portion 80 to the position (point P2) where it has been judged that the carriage 40 comes in contact with the anti-home-position side wall portion 82 is in a predetermined range. Here, the predetermined range means a range including an error in addition to an actual distance between the position (point P1) where it has been judged that the carriage 40 comes in contact with the home-position side wall portion 80 and the position (point P2) where it has been judged that the carriage 40 comes in contact with the anti-home-position side wall portion 82.

That is, the distance between the position (point P1) where it has been judged that the carriage 40 comes in contact with the home-position side wall portion 80 and the position (point P2) where it has been judged that the carriage 40 comes in contact with the anti-home-position side wall portion 82 is fixed. Accordingly, by checking whether the moving distance from the position (point P1) where it has been judged that the carriage 40 comes in contact with the home-position side wall portion 80 to the position (point P2) where it has been judged that the carriage 40 comes in contact with the anti-home-position side wall portion 82 is in the predetermined range, it is possible to simply check whether the position (point P1) of the carriage 40 temporarily determined just before is correct. When the moving distance of the carriage 40 is in the predetermined range, it is confirmed that the position (point P1) of the carriage 40 temporarily determined just before is correct. Here, the check whether the position (point P1) of the carriage 40 temporarily determined is correct can be performed by the use of the controller 60.

When it is confirmed that the position (point P1) of the carriage 40 temporarily determined is correct, the carriage 40 is made to move from point P2 of the anti-home-position side wall portion 82 to the home position HP (step S03). On the other hand, when it is confirmed that the moving distance of the carriage 40 is not in the predetermined range, it is considered that the position of the carriage 40 temporarily determined may not be correct and thus the position check of the carriage may be performed again. In this way, the position of the carriage 40 is determined.

On the other hand, even when the carriage 40 is made to move to the anti-home-position side wall portion 82, the position of the carriage 40 is also determined in the same way. That is, as shown in FIG. 5B, the carriage 40 is made to move until the carriage 40 comes in contact with the anti-home-position side wall portion 82 (step S11).

When the carriage 40 comes in contact with the anti-home-position side wall portion 82, the moving speed of the carriage 40 is equal to or less than a predetermined speed, that is, almost zero in this case. Accordingly, it is possible to judge whether the carriage 40 comes in contact with the anti-home-position side wall portion 82 on the basis of the signal output from the encoder 90.

When it is judged that the carriage 40 comes in contact with the anti-home-position side wall portion 82, the position of the carriage 40 is temporarily determined by considering that the carriage 40 comes in contact with the anti-home-position side wall portion 82 at point P2.

After the position of the carriage 40 is temporarily determined in this way, the carriage 40 is made to move in a direction opposite to the previous moving direction, that is, toward the home-position side wall portion 80 (step S12). Then, the carriage 40 is brought into contact with the home-position side wall portion 80. Here, when the carriage 40 comes in contact with the home-position side wall portion 80, the moving speed of the carriage 40 is equal to or less than a predetermined speed, that is, almost zero in this case. It is possible to easily judge whether the carriage 40 comes in contact with the home-position side wall portion 80 on the basis of the signal output from the encoder 90.

When it is judged that the carriage 40 comes in contact with the home-position side wall portion 80, the moving distance from the position (point P2) where it has been judged that the carriage 40 comes in contact with the anti-home-position side wall portion 82 to the position (point P1) where it has been judged that the carriage 40 comes in contact with the home-position side wall portion 80 is acquired on the basis of the output signal of the encoder 90.

Then, it is checked whether the moving distance from the position (point P2) where it has been judged that the carriage 40 comes in contact with the anti-home-position side wall portion 82 to the position (point P1) where it has been judged that the carriage 40 comes in contact with the home-position side wall portion 80 is in the predetermined range. When the moving distance of the carriage 40 is in the predetermined range, it is confirmed that the position (point P2) of the carriage 40 temporarily determined just before is correct. On the other hand, when the moving distance of the carriage 40 is not in the predetermined range, it may be judged that the position of the carriage 40 temporarily determined is not correct.

When it is confirmed that the position (point P2) of the carriage 40 temporarily determined is correct, the carriage 40 is made to move from point P1 of the home-position side wall portion 80 to the home position HP (step S13).

Actual Procedure

FIG. 6 is a diagram illustrating an example of an actual method of actually determining a position of the carriage 40. Here, when the current position of the carriage 40 is not clear, an example of a method of determining the position of the carriage 40 by making the carriage 40 move to the side of the home position will be described.

In this case, the carriage 40 is first made to slightly move to the anti-home-position side wall portion 82 (step S21). This is because it is considered that the carriage 40 already comes in contact with the home-position side wall portion 80. That is, when the driving motor 58 is driven to move the carriage 40 to the home-position side wall portion 80 in a state where the carriage is in contact with the home-position side wall portion 80, an excessive load may be added to the driving motor 58, thereby causing a problem such as damage. First, by making the carriage 40 slightly move to the anti-home-position side wall portion 82, the carriage 40 is separated from the home-position side wall portion 80 to form a gap therebetween, thereby preventing an occurrence of a load. At this time, the moving distance of the carriage 40 is a very short distance determined in advance.

After the carriage 40 is made to slightly move to the anti-home-position side wall portion 82 in this way, the carriage 40 is made to move to the home-position side wall portion 80 (step 522). At this time, the carriage 40 is made to move until the carriage 40 comes in contact with the home-position side wall portion 80. In this case, the moving speed of the carriage 40 is preferably as low as possible, so that a large impact does not act even if the carriage 40 comes in contact with the home-position side wall portion 80. That is, the carriage 40 is made to move at a low speed.

When the carriage 40 comes in contact with the home-position side wall portion 80, the moving speed of the carriage 40 is equal to or less than a predetermined speed (zero) and it is judged by the controller 60 or the like that the carriage 40 comes in contact with the home-position side wall portion 80 on the basis of the signal output from the encoder 90. When it is judged that the carriage 40 comes in contact with the home-position side wall portion 80, the position of the carriage 40 is temporarily determined by the use of the controller 60 or the like, by considering that the carriage 40 comes in contact with the home-position side wall portion 80 at point P1.

After the position of the carriage 40 is temporarily determined in this way, the carriage 40 is made to move in a direction opposite to the previous moving direction of the carriage 40, that is, toward the anti-home-position side wall portion 82 (step 523). The carriage 40 rapidly moves to the vicinity of point P0 at which the current position of the carriage 40 has been considered as being not clear and from which the carriage 40 having started its movement. The distance from the position where it has been judged that the carriage 40 is located at point P1 to the movement start position P0 can be calculated on the basis of the moving distance of the carriage 40. In this way, by making the carriage 40 move to the vicinity of the movement start position P0, it is possible to reduce the time required for determining the position of the carriage 40.

The moving speed is reduced after the carriage 40 passes through the vicinity of the movement start position P0 and then the carriage 40 is made to slowly move to the anti-home-position side wall portion 82 (step S24). When the carriage 40 comes in contact with the anti-home-position side wall portion 82, the moving speed of the carriage 40 is equal to or less than a predetermined speed (zero) and it is judged that the carriage 40 comes in contact with the anti-home-position side wall portion 82 on the basis of the signal output from the encoder 90.

When it is judged that the carriage 40 comes in contact with the anti-home-position side wall portion 82, the moving distance from the position (point P1) where it has been judged that the carriage 40 comes in contact with the home-position side wall portion 80 to the position (point P2) where it has been judged that the carriage 40 comes in contact with the anti-home-position side wall portion 82 is acquired. The moving distance of the carriage 40 can be acquired on the basis of the output signal of the encoder 90.

It is checked whether the moving distance from the position (point P1) where it has been judged that the carriage 40 comes in contact with the home-position side wall portion 80 to the position (point P2) where it has been judged that the carriage 40 comes in contact with the anti-home-position side wall portion 82 is in the predetermined range. When the moving distance of the carriage 40 is in the predetermined range, it is confirmed by the controller 60 that the position (point P1) of the carriage 40 temporarily determined just before is correct. On the other hand, when the moving distance of the carriage 40 is not in the predetermined range, the position of the carriage 40 temporarily determined may not be correct and thus the position check may be performed again.

When it is confirmed that the position (point P1) of the carriage 40 temporarily determined is correct, the carriage 40 is made to slightly move to the home-position side wall portion 80 (step S25). This is to prevent an occurrence of a problem resulting from a backlash which may occur when the carriage 40 comes in contact with the anti-home-position side wall portion 82.

Thereafter, the carriage 40 is made to move to the home-position side wall portion 80 (step S26). At this time, since the position of the carriage 40 is determined, it is possible to make the carriage 40 rapidly move from point P2 of the anti-home-position side wall portion 82 to point P1 of the home-position side wall portion 80.

Then, the carriage 40 is once brought into contact with the home-position side wall portion 80. This is to take a correct posture of the carriage 40. That is, in this embodiment, the timing belt 54 for moving the carriage 40 is not connected to the center of the carriage 40, but one side (lower side in this case) of the carriage 40, the position of which is shifted from the center of the carriage, as shown in FIG. 4. Accordingly, when the carriage 40 is made to move from the anti-home-position side wall portion 82 to the home-position side wall portion 80, the posture of the carriage 40 may not be matched with the posture at the time of reading an image from the document. Therefore, in this embodiment, by once bringing the carriage 40 into contact with the home-position side wall portion 80 to take the correct posture of the carriage, such a problem can be prevented.

After the carriage 40 once comes in contact with the home-position side wall portion 80 in this way, the carriage 40 is made to move to the home position (step S27). Accordingly, the carriage 40 can be matched with the posture at the time of reading an image from a document. In this way, the position of the carriage 40 is determined before reading an image from the document.

<Applied Examples>

When the moving distance, until it is judged that the carriage 40, the position of which is not clear, comes in first contact with one of the home-position side wall portion 80 and the anti-home-position side wall portion 82 after the carriage 40 starts its movement to the other of the home-position side wall portion 80 and the anti-home position side wall portion 82 is equal to or less than a predetermined distance, the subsequent processes may be omitted.

Figure 7:
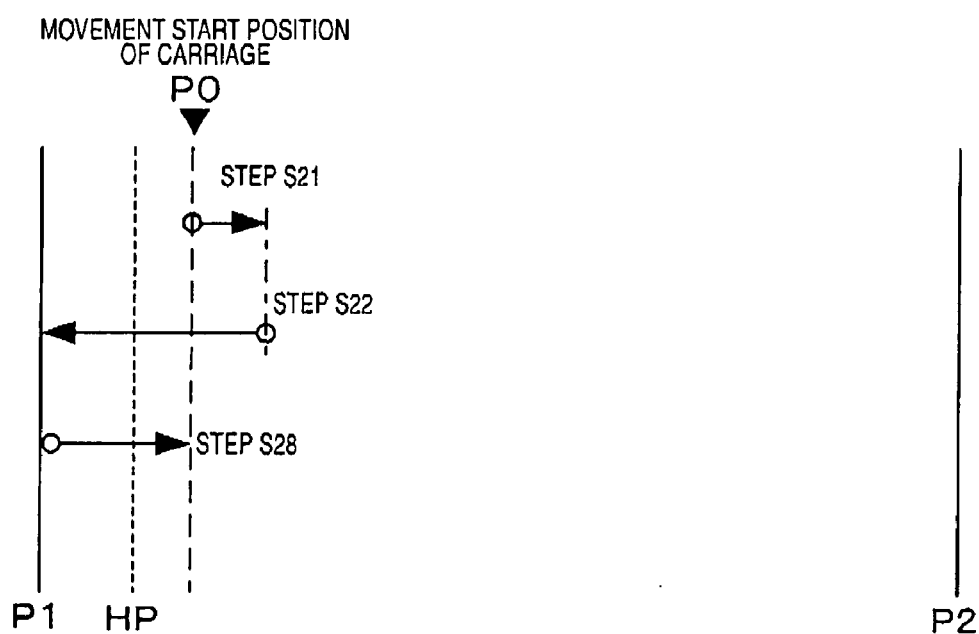
FIG. 7 is a diagram illustrating a method of determining a position when the movement distance of the carriage is short.

FIG. 7 illustrates an example of a position determining procedure when the first moving distance of the carriage 40 is short and thus the subsequent processes are omitted. Here, the carriage 40 is first made to slightly move the anti-home-position side wall portion 82 (step S21). This is to separate the carriage 40 from the home-position side wall portion 80 to form a gap therebetween, thereby preventing an occurrence of a load, when the carriage 40 is already in contact with the home-position side wall portion 80. Here, the moving distance of the carriage 40 is a very short distance that is determined in advance.

Next, the carriage 40 is made to move to the home-position side wall portion 80 (step S22). At this time, the carriage 40 is made to move until the carriage 40 comes in contact with the home-position side wall portion 80. In this case, the moving speed of the carriage 40 is preferably as low as possible, so that a large impact does not act even when the carriage 40 comes in contact with the home-position side wall portion 80. That is, the carriage is made to move at a low speed.

At this time, when the moving distance until it is judged that the carriage 40 comes in contact with the home-position side wall portion 80 after the carriage 40 starts its movement is equal to or less than a predetermined distance, the position of the carriage 40 is not determined temporarily, but completely. That is, it is determined that the carriage 40 is located at point P1. This is because the moving distance until it is judged that the carriage 40 comes in contact with the home-position side wall portion 80 after the carriage 40 starts its movement is short. For this reason, the possibility is very low that the moving speed of the carriage 40 is reduced due to an external impact or the like in the course of the carriage 40's movement and it is thus judged that the carriage 40 comes in contact with the home-position side wall portion 80 even when the carriage 40 does not come in contact with the home-position side wall portion 80.

Here, the predetermined distance for determining whether the position of the carriage 40 is determined temporarily or completely may be set, for example, on the basis of the case where the carriage 40 is originally located at the home position HP, or the like. That is, it is preferable that the predetermined distance is set to be more or less the distance between the home position HP and point P1 of the home-position side wall portion 80. By setting the predetermined distance in this way, it is possible to greatly reduce the time required for determining the position of the carriage 40 when the carriage 40 is located at the home position HP.

After the position of the carriage 40 is determined completely in this way, the carriage 40 is made to move to the anti-home-position side wall portion 82 and stops at the home position HP (step S28).

In this embodiment described above, when the current position of the carriage 40 is not clear, the carriage 40 is first made to move to one of the home-position side wall portion 80 and the anti-home-position side wall portion 82 so as to bring the carriage 40 into contact with the one of the home-position side wall portion 80 and the anti-home-position side wall portion 82. Accordingly, when it is judged that the carriage 40 comes in contact with the one of the home-position side wall portion 80 and the anti-home-position side wall portion 82, the position of the carriage 40 is determined temporarily. Thereafter, the carriage 40 is made to move in the opposite direction to come in contact with the other of the home-position side wall portion 80 and the anti-home-position side wall portion 82. Accordingly, when it is judged that the carriage 40 comes in contact with the other of the home-position side wall portion 80 and the anti-home-position side wall portion 82, the moving distance of the carriage 40 between the position (point P1) where it has been judged that the carriage 40 comes in contact with the home-position side wall portion 80 and the position (point P2) where it has been judged that the carriage 40 comes in contact with the anti-home-position side wall portion 82 is acquired. By checking whether the moving distance is in a predetermined range, it is possible to simply check whether the position of the carriage 40 temporarily determined is correct. Accordingly, it is possible to correctly determine the position of the carriage 40.

When the carriage 40 moves in the opposite direction after the position of the carriage 40 has been temporarily determined, the time for determining the position of the carriage 40 can be reduced by making the carriage 40 move to the movement start position P0 at a high speed. By making the carriage 40, the position of which has been completely determined, move at a high speed at the time of making the carriage 40 move to the home position HP, it is possible to additionally reduce the time.

Other Embodiments

Although the invention has been described with reference one embodiment, the embodiment is to facilitate the understanding the invention, but not to define the invention. The invention can be changed or modified without departing from the gist thereof and also includes the equivalents thereof. Particularly, the following embodiments are included in the invention.

<Carriage>

In the above-mentioned embodiment, the carriage 40 having the image reading sensor (image sensor 50) for reading an image from a document in an image reading device has been exemplified as the "carriage". However, any type of carriage may be used as the "carriage". That is, any type of carriage may be used so long as it is a carriage reciprocating in a predetermined range along a predetermined direction.

<Contact Portion>

In the above-mentioned embodiment, the wall portions 80 and 82 shown in FIG. 4 and with which the carriage 40 having the image reading sensor (image sensor 50) for reading an image from a document comes in contact has been exemplified as the "contact portions". However, the "contact portions" are not limited to the wall portions 80 and 82. That is, any type of contact portions may be used so long as they are contact portions that disposed at both ends of a predetermined range in which the carriage reciprocates and that comes in contact with the carriage to regulate the movement of the carriage.

<Judgment Section>

In the above-mentioned embodiment, the "judgment section" judges whether the carriage 40 is equal to or less than a predetermined speed, that is, almost zero in this case, on the basis of the detection signal output from the encoder 90 for detecting the moving speed of the carriage 40. However, the "judgment section" may not necessarily employ such a method. That is, any method may be used so long as it can judge whether the carriage comes in contact with the contact portions (wall portions 80 and 82).

<Position Determining Device of Carriage>

In the above-mentioned embodiment, it has been described that the "device for determining a position of a carriage" is applied as a position determining device of the image reading device 10. However, the "position determining device of a carriage" is not limited to the case where it is applied to the image reading device 10. That is, it may be applicable to any type of device so long as it can determine a position of a carriage. Specifically, the carriage may be a print head of a printer such as an ink jet printer.

What is claimed is:

1. A document reading apparatus comprising:
   a carriage, including an image reading sensor for reading an image from a document, and adapted to reciprocate in a predetermined range along a predetermined direction;
   contact portions, disposed at both ends of the predetermined range, wherein the carriage comes in contact with the contact portions so that a movement of the carriage is regulated;
   a judgment section, operable to judge whether the carriage comes in contact with the contact portions;
   a positional information temporary determining section, operable to temporarily determine positional information of the carriage when the judgment section judges that the carriage comes in contact with one of the contact portions; and
   a positional information check section, after the positional information is temporarily determined by the positional information temporary determining section, operable to check whether the positional information is correct based on a moving distance of the carriage from a first position where the judgment section judges that the carriage comes in contact with the one of the contact portions to a second position where the judgment section judges that the carriage comes in contact with the other of the contact portions, and operable to determine the positional information when it is confirmed that the positional information is correct, wherein
   after the positional information is temporarily determined by the positional information temporary determining section, when the carriage moves from the first position to the second position, the carriage moves to a third position where the carriage starts to move before the positional information is temporarily determined by the positional information temporary determining section, at a moving speed greater than a moving speed at which the carriage moves before the positional information is temporarily determined by the positional information temporary determining section.

2. The document reading apparatus according to claim 1, further comprising: a speed detector, operable to detect the moving speed of the carriage, wherein
   the judgment section judges whether the carriage comes in contact with the contact portions based on the moving speed detected by the speed detector.

3. The document reading apparatus according to claim 2, wherein
   the judgment section judges that the carriage comes in contact with the contact portions when the moving speed detected by the speed detector is equal to or less than a predetermined speed.

4. The document reading apparatus according to claim 1, wherein
   the positional information check section does not check whether the positional information is correct, when the moving distance of the carriage until the judgment section judges that the carriage comes in contact with the one of the contact portions after the carriage starts to move to come in contact with the one of the contact portions is shorter than a predetermined distance.

5. A method of determining a position of a carriage including an image reading sensor for reading an image from a document and adapted to reciprocate in a predetermined range, the method comprising:
   moving the carriage in a first direction;
   judging that the carriage comes in contact with one of contact portions that are disposed at both ends of the predetermined range and regulate a movement of the carriage;
   moving the carriage at a speed greater than a speed at a time of moving in the first direction, to a position where the carriage starts to move in the first direction, in a second direction opposite to the first direction;
   judging that the carriage comes in contact with the other of the contact portions;
   checking whether positional information is correct based on a moving distance from a position where it has been judged that the carriage comes in contact with the one of the contact portions to a position where it has been judged that the carriage comes in contact with the other of the contact portions; and
   determining the positional information when the positional information is correct.

* * * * *